United States Patent
Song

(10) Patent No.: US 8,830,930 B2
(45) Date of Patent: Sep. 9, 2014

(54) DEVICE IN WIRELESS NETWORK, DEVICE RESOURCE MANAGEMENT APPARATUS, GATEWAY AND NETWORK SERVER, AND CONTROL METHOD OF THE NETWORK SERVER

(75) Inventor: Pyeong Jung Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 316 days.

(21) Appl. No.: 13/210,506

(22) Filed: Aug. 16, 2011

(65) Prior Publication Data

US 2012/0039202 A1 Feb. 16, 2012

(30) Foreign Application Priority Data

Aug. 16, 2010 (KR) .......................... 10-2010-0078622
Mar. 23, 2011 (KR) .......................... 10-2011-0025735

(51) Int. Cl.
| | | |
|---|---|---|
| *H04W 4/00* | (2009.01) | |
| *H04W 72/00* | (2009.01) | |
| *H04W 88/14* | (2009.01) | |
| *H04W 84/18* | (2009.01) | |
| *H04W 88/16* | (2009.01) | |
| *H04W 74/00* | (2009.01) | |

(52) U.S. Cl.
CPC .............. *H04W 72/00* (2013.01); *H04W 88/14* (2013.01); *H04W 84/18* (2013.01); *H04W 88/16* (2013.01); *H04W 74/00* (2013.01)
USPC .......................................... 370/329; 370/341

(58) Field of Classification Search
CPC ..... H04W 72/00; H04W 74/00; H04W 84/18; H04W 88/14; H04W 88/18
See application file for complete search history.

(56) References Cited

U.S. PATENT DOCUMENTS

| | | | |
|---|---|---|---|
| 6,721,581 B1 | 4/2004 | Subramanian | |
| 7,016,360 B1 * | 3/2006 | Dong ............................ | 370/401 |
| 2002/0181476 A1 * | 12/2002 | Badamo et al. ............... | 370/401 |
| 2010/0014423 A1 * | 1/2010 | Furuskar et al. ............. | 370/235 |
| 2010/0061334 A1 * | 3/2010 | Gault et al. ................... | 370/330 |

FOREIGN PATENT DOCUMENTS

| | | |
|---|---|---|
| KR | 10-0514304 | 9/2005 |
| KR | 1020100063611 | 6/2010 |

* cited by examiner

*Primary Examiner* — Chi Pham
*Assistant Examiner* — Soon-Dong D Hyun
(74) *Attorney, Agent, or Firm* — Nelson Mullins Riley & Scarborough LLP; Anthony A. Laurentano, Esq.; Dipti Ramnarain, Esq.

(57) ABSTRACT

Provided is a device resource management apparatus in a wireless network, the device resource management apparatus including an access mode selection module to select a predetermined access mode among a plurality of access modes for a device, each of the plurality of access modes determining a type of a medium included in an access route between the device and an opponent device, and a device agency module to obtain an agent profile corresponding to the device when an access route between the device and the opponent device is formed according to the predetermined access mode, and to perform, as a proxy for the device, at least one function defined by the agent profile.

8 Claims, 14 Drawing Sheets

DEVICE IN WIRELESS NETWORK, DEVICE RESOURCE MANAGEMENT APPARATUS, GATEWAY AND NETWORK SERVER, AND CONTROL METHOD OF THE NETWORK SERVER

FIELD OF THE INVENTION

The present invention relates to a device, a device resource management apparatus, a gateway, and a network server in a wireless network, and a method of controlling the network server in the wireless network.

DESCRIPTION OF THE RELATED ART

Nowadays, machine to machine (M2M) communication is being used actively, and it is expected that seven trillion devices, corresponding to one thousand times the global population of seven billion, may exist on Earth around the year 2020. As such, it is expected that traffic and signaling loads generated by a great number of devices will be immense.

However, various types of home appliances and sensors may use different wireless interfaces such as Bluetooth, Zigbee, ultra-wideband (UWB), wireless fidelity (Wi-Fi), and the like depending on a use, a manufacturer, and the like. Thus, maintenance and repair may be complicated due to diversity and complexity of the interfaces.

According to circumstances, in order to handle the diversity and complexity of the interfaces, software and hardware functions, and the like that are excessively complex in comparison to a function of a device may be installed, or a change of software and hardware functions may be requested.

Further, since a device may generally use a combination of a near field communication and a cellular communication to communicate with a server at a relatively long distance, compatibility between two interfaces may be required and thus, an overhead may be additionally applied.

Accordingly, there is a desire for a device having mobility and varied usage, and an apparatus and method providing various wireless interfaces independent of a type of the device.

DISCLOSURE OF THE INVENTION

Subjects to be Solved

An aspect of the present invention provides a device, a device resource management apparatus, a gateway, a network server, and a method of controlling the network server that may minimize software and hardware functions of a device, and may optimize a network access scheme with an opponent service or an opponent device to communicate according to a location and circumstance of the device.

Another aspect of the present invention also provides a device, a device resource management apparatus, a gateway, a network server, and a method of controlling the network server that may provide a difference access scheme between a device and an opponent device or between a device and an application server according to a wave environment and process ability of a device.

Still another aspect of the present invention also provides a device, a device resource management apparatus, a gateway, a network server, and a method of controlling the network server that may change an access scheme of a device according to a circumstance when a location or a wave environment of the device changes actively.

Yet another aspect of the present invention also provides a device, a device resource management apparatus, a gateway, a network server, and a method of controlling the network server that may reconstruct, according to a use and change information of a device, a function of a wireless interface designed based on a traffic characteristic of various types of devices.

Further another aspect of the present invention also provides a device, a device resource management apparatus, a gateway, a network server, and a method of controlling the network server that may provide an interworking scheme between a wireless interface used for near field communication and a wireless interface used for cellular communication when the wireless interfaces are different from each other.

Technical Solutions

According to an aspect of the present invention, there is provided a device resource management apparatus in a wireless network, the device resource management apparatus including an access mode selection module to select a predetermined access mode among a plurality of access modes for a device, each of the plurality of access modes determining a type of a medium included in an access route between the device and an opponent device, and a device agency module to obtain an agent profile corresponding to the device when an access route between the device and the opponent device is formed according to the predetermined access mode, and to perform, as a proxy for the device, at least one function defined by the agent profile.

According to another aspect of the present invention, there is provided a device in a wireless network, the device including a measuring unit to measure a magnitude of a signal received from an opponent device in communication using a predetermined access mode among a plurality of access modes for a device, each of the plurality of access modes determining a type of a medium included in an access route between the device and the opponent device, a comparing unit to compare a magnitude of a signal received from the opponent device with a magnitude of a signal received from the medium currently accessed by the device, and a reconstructing unit to reconstruct a form of functional elements of the device according to an access mode selected by a device resource management apparatus based on a result of the comparison.

According to still another aspect of the present invention, there is provided a gateway in a wireless network, the gateway including an interworking layer to perform an adaptive interworking between a wireless interface for near field communication of a device and a wireless interface for cellular communication of the device, and a device agency layer to select a matrix for functional elements corresponding to a function to be performed as a proxy for the device according to a request from the device, and to perform the corresponding function according to the selected matrix for functional elements.

According to yet another aspect of the present invention, there is provided a network server in a wireless network, the network server including a receiver to receive at least one piece of change information about a change between a feature of the device and context-aware information including a use of the device, a capability of the device, or a propagation environment for the device, a map composing unit to compose a state machine map for reconstructing, in real time, a form of functional elements of the device based on the at least one piece of change information, and a reconstructing unit to reconstruct the functional elements of the device according to the state machine map.

According to further another aspect of the present invention, there is provided a method of controlling a network server in a wireless network, the method including receiving at least one piece of change information about a change between a feature of the device and context-aware information including a use of the device, a capability of the device, or a propagation environment for the device, selecting template information of a state machine reflecting the at least one piece of change information, and reconstructing the functional elements of the device based on the template information.

Advantageous Effects of the Invention

According to embodiments of the present invention, it is possible to provide an optimal network access scheme appropriate for a device to communicate with an opponent server or an opponent device by structuralizing a universal cellular-based wireless interface, for example, a 3rd generation partnership project (3GPP) long teen evolution (LTE)-advanced wireless interface for each functional element, and by selectively constructing functional elements of hardware or software according to use and circumstance of the corresponding device.

According to embodiments of the present invention, it is possible to reduce delay due to compatibility processing by reducing a difference between a wireless interface of near field communication performed by a device and a wireless interface of cellular communication performed by a device, it is possible to support maintenance and management of a device through an excellent maintenance and management function included in a cellular communication system, and it is possible to enhance reliability of a device while reducing manufacturing costs of the device by equally applying a wireless interface regardless of a device type.

BEST MODE FOR CARRYING OUT THE INVENTION

Figure 1:
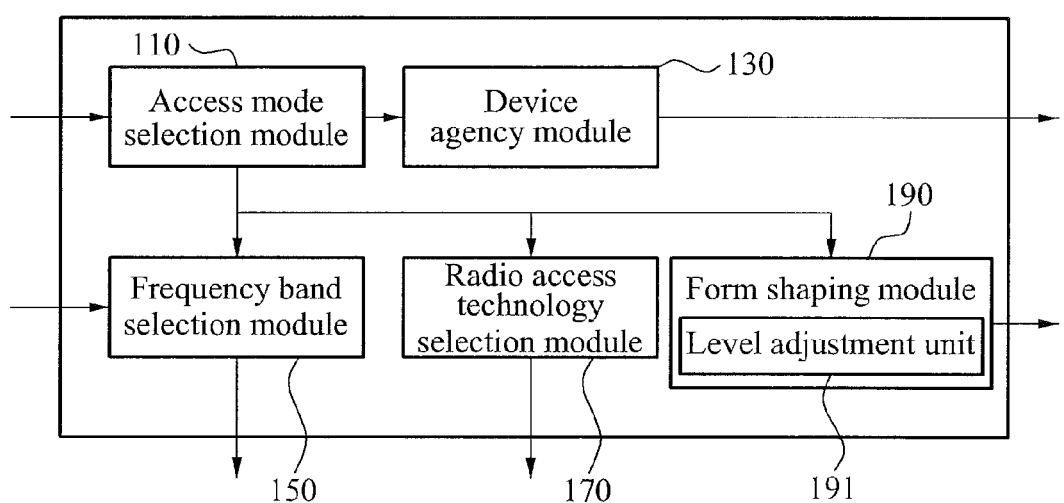
FIG. 1 is a block diagram illustrating a device resource management apparatus in a wireless network according to embodiments of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a block diagram illustrating a device resource management apparatus in a wireless network according to embodiments of the present invention.

Referring to FIG. 1, a device resource management apparatus 100 according to embodiments of the present invention may include an access mode selection module 110 and a device agency module 130. The device resource management apparatus 100 according to embodiments of the present invention may further include a frequency band selection module 150, a radio access technology selection module 170, and a form shaping module 190.

The access mode selection module 110 may select a predetermined access mode appropriate to the corresponding device among a plurality of access modes for a device. The device and an opponent device may include, for example, a smart phone, a car, a home appliance, a robot, or a sensor based body.

Each of the plurality of access modes may determine a type of a medium included in an access route between the device and the opponent device.

That is, the plurality of access modes may include at least one of a first access mode having an access route that includes a network infrastructure as the medium, a second access mode having an access route that includes a gateway as the medium, a third access mode directly accessing the opponent device through air rather than using the medium, and a fourth access mode having an access route that includes a device adjacent to the device as the medium. The plurality of access modes will be further described with reference to FIG. 5 and FIG. 6.

The access mode selection module 110 may select the predetermined access mode based on parameter information including at least one of a magnitude of a signal received from the opponent device, an interference signal level for the device, a power consumption level of the device, a charging level of the device, and based on a weighting for each of the parameter information.

The access mode selection module 110 may select the predetermined access mode based on a result obtained by comparing a magnitude of a signal the device receives from the opponent device with a predetermined threshold for changing the access mode.

A scheme of selecting the predetermined access mode by the access mode selection module 110 will be further described with reference to FIG. 7 and FIG. 8.

The access mode selection module 110 may select the predetermined access mode according to a signal, received from the device, requesting a change of an access mode, or may select the predetermined access mode according to a result of the comparison received from the device.

The access mode selection module 110 may receive a magnitude of the received signal of the device, and may select the predetermined access mode by comparing the magnitude with a predetermined threshold for changing an access mode. The predetermined threshold may correspond to, for example, a threshold for a change of an access mode that is a type of statistic set according to a system operation.

The device agency module 130 may obtain an agent profile corresponding to the device, and to perform, as a proxy for the device, at least one function defined by the agent profile. The agent profile corresponding to the device may be obtained from the device when an access route between the device and the opponent device is formed according to the predetermined access mode.

For example, the device agency module 130 may perform the at least one function by communicating with a network server, and may transmit, to the device, a message including a result of performing the at least one function and access information used for accessing the opponent device.

The network server may correspond to a common platform server or a cloud network/server.

In this instance, by the device agency module 130 performing the at least one function defined by the agent profile of the device, for example, a communication function, a complexity of software and hardware functions of the device may be reduced.

The frequency band selection module 150 may dynamically assign or change, based on interference at the predetermined access mode, a frequency band to be used by the device using a cognitive radio technology so as to minimize interference during communication.

The radio access technology selection module 170 may determine a radio access technology for the device based on a characteristic of traffic, and may inform the device about information associated with the determined radio access technology.

When the device has a multi-mode function, the radio access technology selection module 170 may determine an optimal radio access technology appropriate to each mode function, and may inform the device about information associated with the optimal radio access technology.

In particular, when the device has a multi-mode function, the radio access technology selection module 170 may select a radio access technology appropriate to a traffic characteristic of each media for a multimedia transmission, and may simultaneously transmit the selected radio access technology in multiple modes. The radio access technology selection module 170 may disperse single media traffic in several radio access technologies for a single media transmission.

The form shaping module 190 may change, in real time, a form of functional elements, for example, software, hardware, firmware, and the like of the device based on at least one piece of change information about a change between a feature of the device and context-aware information including a use of the device, a capability of the device, or a propagation environment for the device. Here, a characteristic of the device may include a power consumption of the device, a size of the device, and the like.

As an example, the form shaping module 190 may optimize a form of functional elements of the device based on a plug & play function of the device and information about a change such as a change of a use or context-aware information of the device.

The form shaping module 190 may further include a level adjustment unit 191 that adjusts a complexity level of the functional elements of the device based on a use, a power consumption, and a size of the device.

Figure 2:
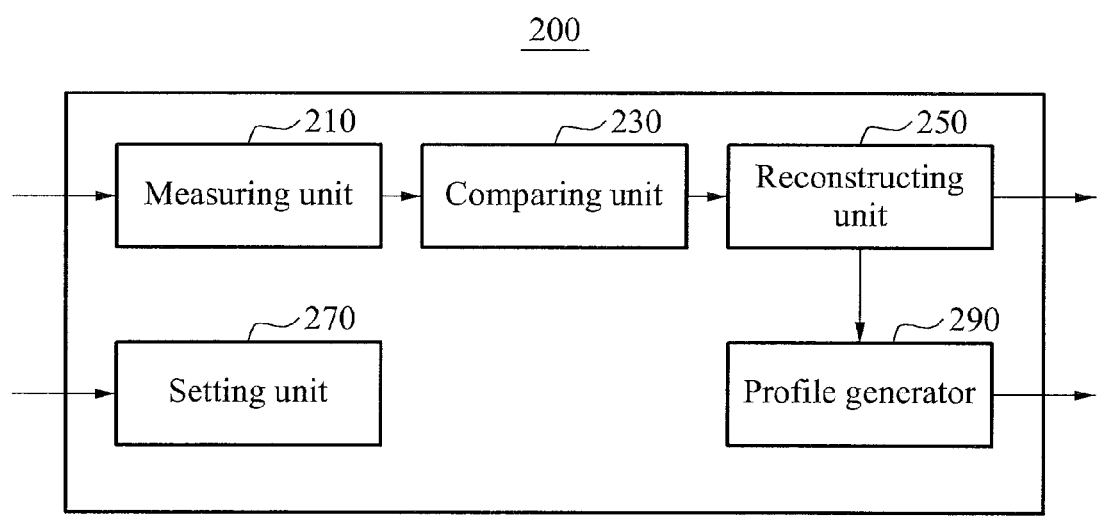
FIG. 2 is a block diagram illustrating a device in a wireless network according to embodiments of the present invention.

FIG. 2 is a block diagram illustrating a device in a wireless network according to embodiments of the present invention.

Referring to FIG. 2, a device 200 may include a measuring unit 210, a comparing unit 230, and a reconstructing unit 250. The device 200 may further include a setting unit 270 and a profile generator 290.

The measuring unit 210 may measure a magnitude of a signal received from an opponent device in communication using a predetermined access mode among a plurality of access modes for a device. Here, each of the plurality of access modes may determine a type of a medium included in an access route between the device and the opponent device.

The plurality of access modes may include at least one of a first access mode having an access route that includes a network infrastructure as the medium, a second access mode having an access route that includes a gateway as the medium, a third access mode directly accessing the opponent device without using the medium, and a fourth access mode having an access route that includes an adjacent device of the device as the medium. Here, in the third access mode, it may be understood that the device directly accesses the opponent device using air as a medium.

A characteristic of the plurality of access modes and a change of an access mode of the device will be further described with reference to FIG. 6 through FIG. 8.

The comparing unit 230 may compare a magnitude of a signal received from the opponent device with a magnitude of a signal received from the medium currently accessed by the device according to a predetermined access mode, for example, a network infrastructure, a gateway, an adjacent device or from the opponent device.

The reconstructing unit 250 may reconstruct a form of functional elements, for example, software and hardware of the device according to an access mode selected by a device resource management apparatus based on a result of the comparison.

The setting unit 270 may set a traffic route to the opponent device using access information used for mutual access with the opponent device. In this instance, the access information may be received from the device resource management apparatus.

The access information may include at least one of an identification (ID) number of the opponent device, an Internet protocol (IP) address of the opponent device, information about a radio resource used for communication with the opponent device, and information about an access timing for the opponent device.

The setting unit 270 may set functional elements of the device according to a complexity level that is based on use, power consumption, and a size of the device.

The profile generator 290 may generate an agent profile including at least one function to be performed by the device resource management apparatus as a proxy for the device.

Figure 3:
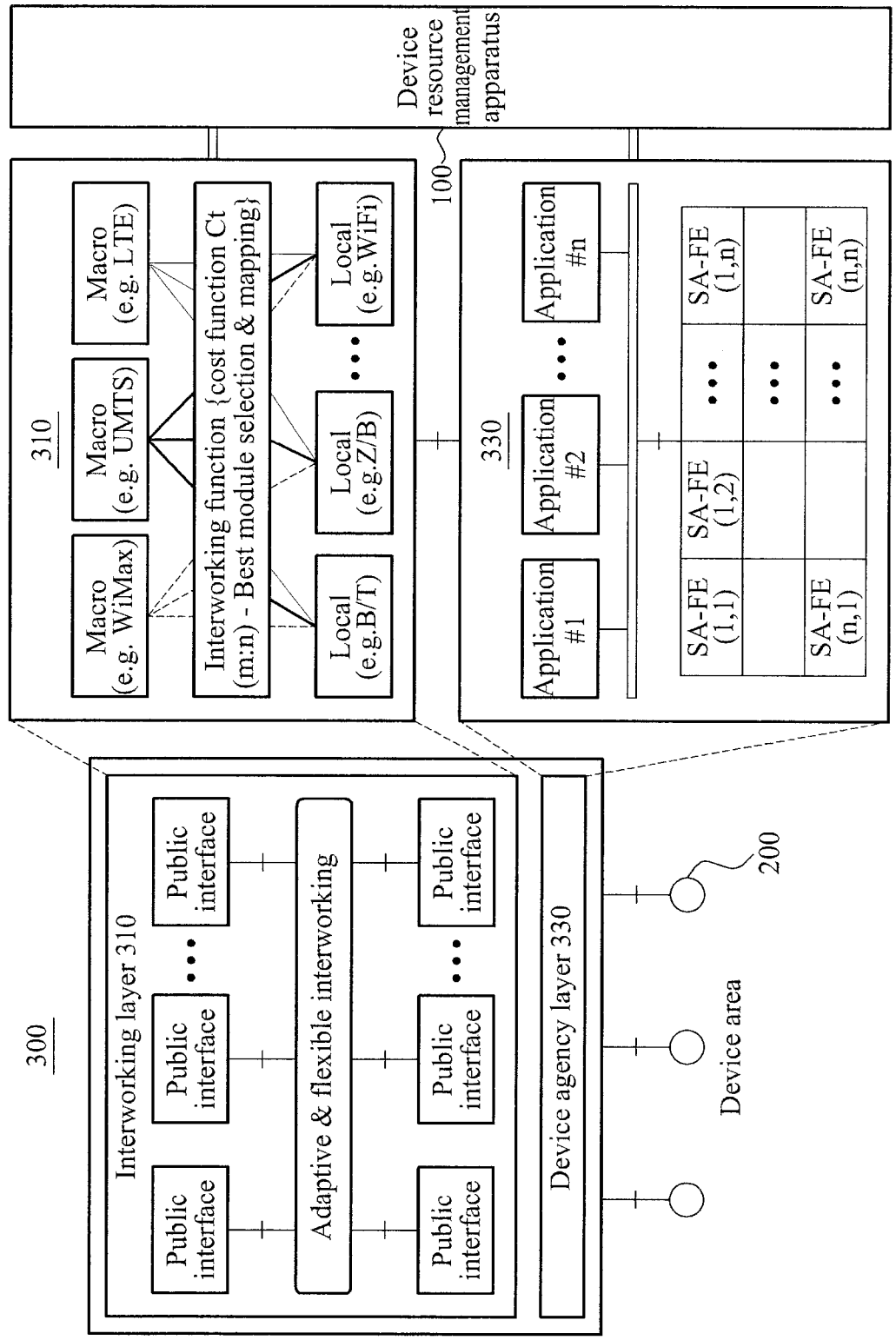
FIG. 3 is a block diagram illustrating a gateway in a wireless network according to embodiments of the present invention.

FIG. 3 is a block diagram illustrating a gateway in a wireless network according to embodiments of the present invention. Referring to FIG. 3, a gateway 300 according to embodiments of the present invention may include an interworking layer 310 and a device agency layer 330 for supporting effective communication between near field communication and cellular communication.

The interworking layer 310 may perforin an adaptive interworking between a wireless interface for near field communication of a device and a wireless interface for cellular communication of the device.

The device agency layer 330 may select a matrix for functional elements corresponding to a function to be performed as a proxy for the device according to a request from the device, and may perform the corresponding function according to the selected matrix for functional elements. The device agency layer 330 may inform the device about a result of performing the corresponding function according the selected matrix for functional elements.

The device agency layer 330 may further include a matrix in which functional elements used for the device are shown according to information about a change of the device. Here, the matrix may correspond to, for example, content recorded in a state machine map changed into a matrix form.

The information about the change of the device may include at least one of a feature of the device and a context-aware information including a use of the device, a capability of the device, or a propagation environment for the device.

Figure 4:
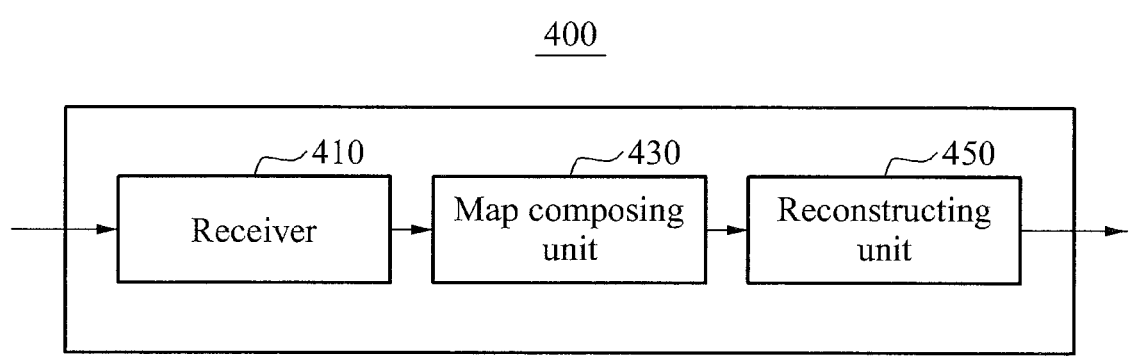
FIG. 4 is a block diagram illustrating a network server in a wireless network according to embodiments of the present invention.

FIG. 4 is a block diagram illustrating a network server in a wireless network according to embodiments of the present invention.

Referring to FIG. 4, a network server 400 according to embodiments of the present invention may include a receiver 410, a map composing unit 430, and a reconstructing unit 450.

The receiver 410 may receive at least one piece of change information about a change between a feature of the device and context-aware information including a use of the device, a capability of the device, or a propagation environment for the device.

The map composing unit 430 may compose a state machine map for reconstructing, in real time, a form of functional elements of the device based on the at least one piece of change information. A scheme of reconstructing the state machine map will be described with reference to FIG. 13 and FIG. 14.

The reconstructing unit 450 may reconstruct the functional elements of the device according to the state machine map.

Figure 5:
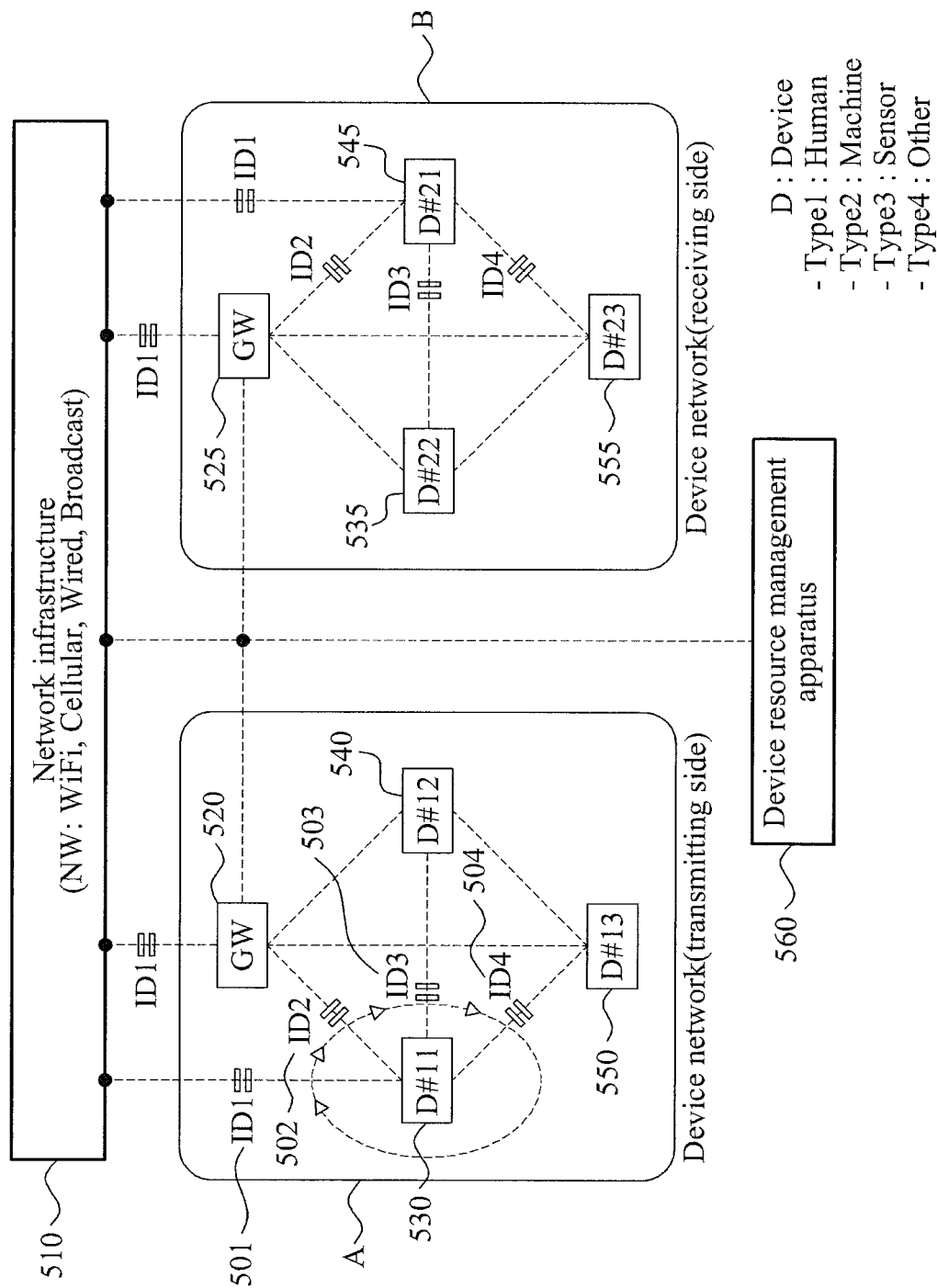
FIG. 5 is a diagram illustrating a configuration of a network including a device according to embodiments of the present invention.

FIG. 5 is a diagram illustrating a configuration of a network including a device according to embodiments of the present invention.

Referring to FIG. 5, a network including a device may include a network infrastructure 510, a gateway GW 520, a gateway GW 525, devices D#xy 530, 540, and 550, for which x=1, y=1, 2, 3, devices D#xy 535, 545, and 555, for which x=2, y=1, 2, 3, and a device resource management apparatus 560.

A communication connection between devices in a transmitting area A and a receiving area B in a network may be performed via a wired and wireless network infrastructure 510, via the gateways GWs 520 and 525, and directly between the devices. A connection between the devices D#xy 530, 540, 550, 535, 545, and 555, and a network server may be performed via the network infrastructure 510 or the gateways GWs 520 and 525.

The network infrastructure 510 may include a wired and wireless access network such as a wireless fidelity (Wi-Fi) network, a cellular network, a wired network, and a broadcast network, and the like.

In a case of the wireless network, the network infrastructure 510 may correspond to a base station (BS), a base transceiver station (BTS), a NodeB, an evolved-NodeB (eNodeB), an automatic calling router (ACR), an access point (AC), and the like.

The gateways GWs 520 and 525 may have an interworking function between the devices D#xy 530, 540, 550, 535, 545, and 555, and the network infrastructure 510.

The devices D#xy 530, 540, 550, 535, 545, and 555, may include a smart phone, a car, a home appliance, a robot, or a sensor based body according to the corresponding type.

The device resource management apparatus 560 may be incorporated in the gateways GWs 520 and 525 or the network infrastructure 510, may support or manage communication of the devices D#xy 530, 540, 550, 535, 545, and 555, and may include a function for selecting an optimal access route, a function for selecting an optimal frequency band, a function for selecting an optimal wireless access technology mode, an agency function for the devices D#xy 530, 540, 550, 535, 545, and 555, and a function for automatically constructing and optimizing forms of functional elements of a device.

The device resource management apparatus 560 may identify an optimal access route for a routing of the devices D#xy 530, 540, 550, 535, 545, and 555, by the function for selecting an optimal access route. For example, a predetermined device D#11 530 may select, as a access route for communicating with an opponent device or a network server, one of four connection schemes detailed below according to a wave environment of a device, a device capability, and the like.

(1) A network access via a mobile network 501, which is referred to as an NW access and corresponds to an interface Id1.

(2) A connection via a gateway 502, which is referred to as a GW access and corresponds to an interface Id2.

(3) A direct connection to an opponent device 503, which is referred to as a DM access and corresponds to an interface Id3.

(4) A relay access via a device adjacent to the corresponding device 504, which is referred to as a relay (RM) access and corresponds to an interface Id4.

A change among the four access schemes described in the foregoing will be described with reference to FIG. 6.

Figure 6:
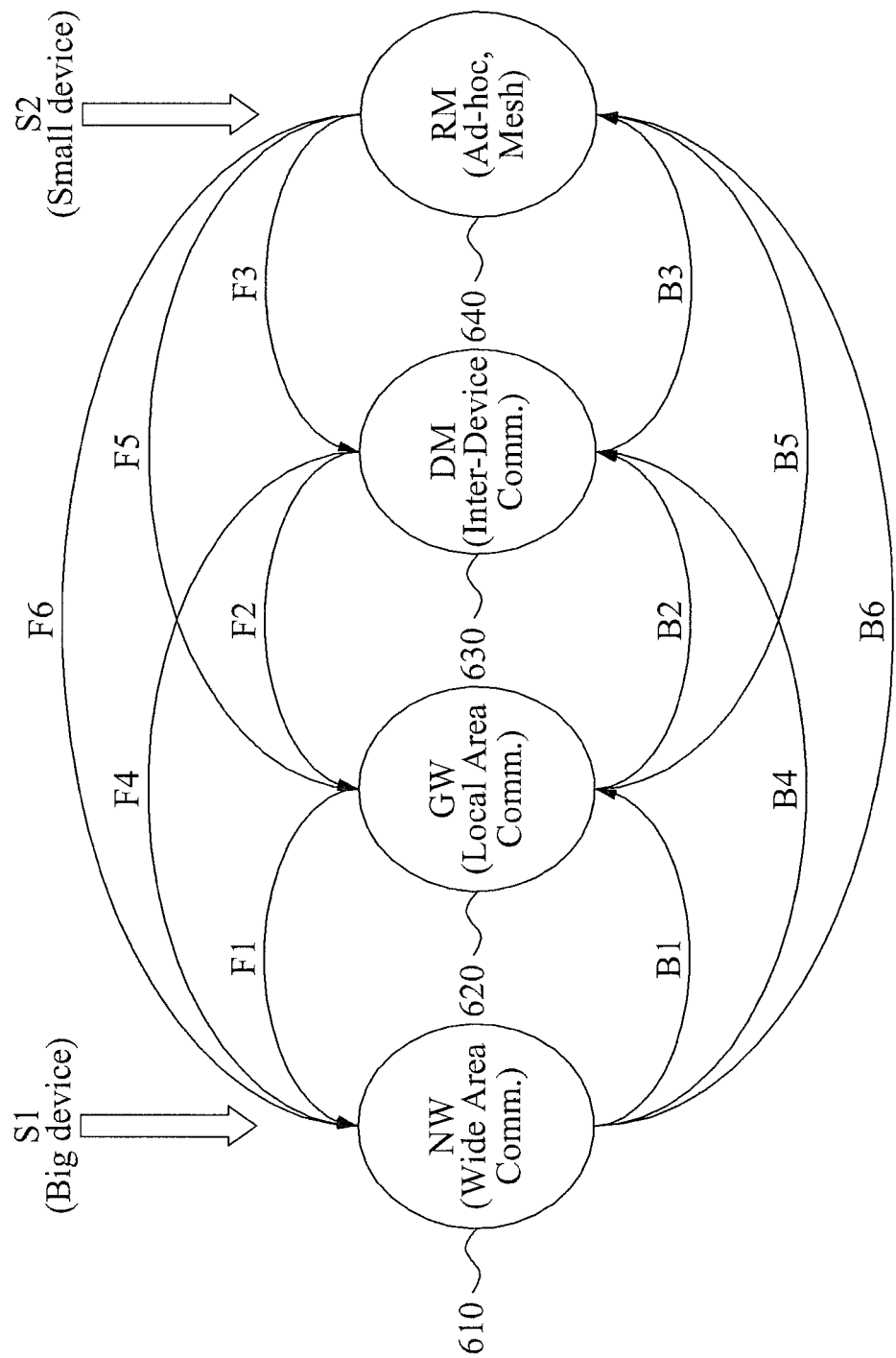
FIG. 6 is a diagram illustrating a change of an access mode of a device according to embodiments of the present invention.

FIG. 6 is a diagram illustrating a change of an access mode of a device according to embodiments of the present invention.

Referring to FIG. 6, an access mode of a device may vary depending on a magnitude of a received signal, a level of an interference signal, and the like, and each of access modes and a mechanism for changing an access mode are described in the following.

A network access (NW) mode 610 may be an access mode in which a device communicates with an opponent device or a network server via a network infrastructure, and may correspond to a relatively large-sized device such as a car, a robot, and the like.

A device gateway (GW) mode 620 may be a mode in which a device accesses a wireless network via a gateway.

A direct communication (DM) mode 630 may be a mode in which a device directly communicates with an opponent device rather than communicating via a network infrastructure or a gateway.

A relay access (RM) mode 640 may be a mode operating in an Ad-hoc or Mesh structure.

For example, when a device operating in the NW mode 610 desires to effectively use a wireless resource or reduce a power consumption, the device may change an access mode to one of the GW mode 620, the DM mode 630, and the RM mode 640 corresponding to B1, B4, and B6, respectively.

When a magnitude of a signal received by a device operating in the RM mode 640 decreases to be less than or equal to a threshold due to deterioration of a wave environment or a wireless link is disconnected, the device may change an access mode to one of the DM mode 630, the GW mode 620, and the NW mode 610 corresponding to F3, F5, and F6, respectively.

A device resource management apparatus may select a predetermined access mode relatively appropriate to the corresponding device based on parameter information and a weighting wi for each parameter information as illustrated in Equation 1 and Equation 2.

Here, the parameter information may include at least one of a received signal magnitude rx_str corresponding to a magnitude of a signal received from an opponent device, an interference signal level intf_lev corresponding to a level of an interference signal for a device, a consumption power level pwr_req of a device, and a charging level chg_lev.

$$\text{Optimal access mode (Best Mode)} = \text{Max } \{\text{Mode }(1), \text{Mode }(2), \ldots, \text{Mode }(i)\}, i=1\text{-}n, n\text{: number of cases of access modes} \quad \text{[Equation 1]}$$

$$\text{Mode }(i) = F\{\text{received signal magnitude }(rx\_str(i))\}*w1 + \text{interference signal level }(intf\_lev(i))*w2 + \text{consumption power level }(pwr\_req(i))*w3 + \text{charging level }(chg\_lev(i))*w4\} \quad \text{[Equation 2]}$$

Here, each parameter may use a value directly measured by a device or statistics (or standard value) according to a system operation of a provider, and a weighting wi of each parameter may vary according to an operation policy of a provider.

Table 1 shows characteristics of the four access modes for a device.

TABLE 1

| division of access mode | network access mode (NW mode) | device gateway mode (GW mode) | direct communication mode (DM mode) | relay access mode (RM mode) |
|---|---|---|---|---|
| Use | Outdoors | Indoors | Indoors (LOS) | Indoors (Relay) |
| Coverage area | Wide Area | Local Area | Inter-Device | Relay |
| Benefit | General access mode | Traffic focusing effect and Prevention of flooding infrastructure | Low power and High efficient resource | Ad-hoc and Mesh access |
| Start point of connection (for device type) | Big Device (car, robot, mechanical devices, and the like) | Any device (e.g. Bio-device) | Any device | Any device |

Figure 7:
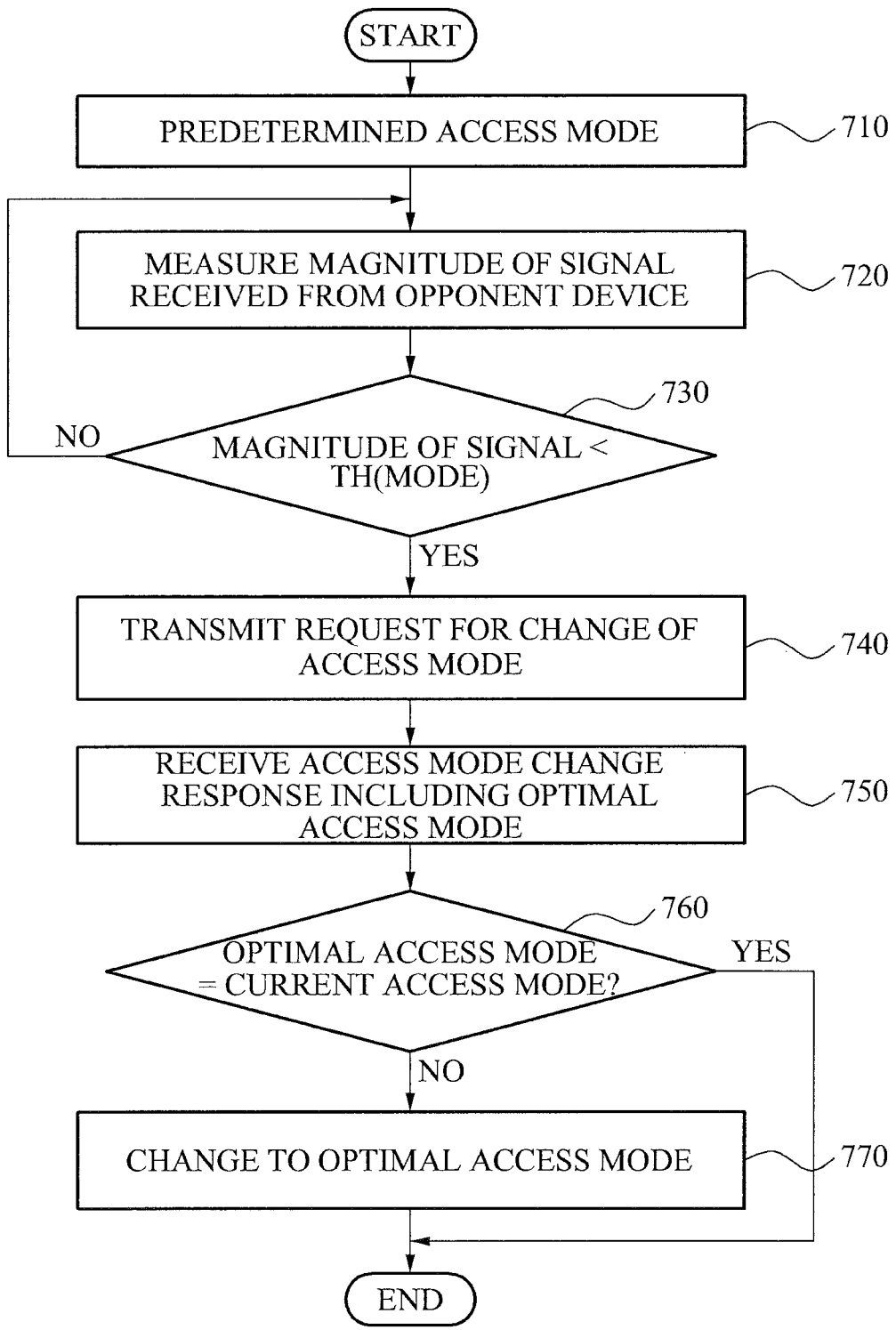
FIG. 7 is a flowchart illustrating a method of changing an access mode by a device according to embodiments of the present invention.

FIG. 7 is a flowchart illustrating a method of changing an access mode by a device according to embodiments of the present invention. The device may change an access mode due to a change of a use, a communication location, a propagation environment, and the like of the device.

Referring to FIG. 7, a device in a predetermined access mode state such as an idle state, a connected state, and the like in operation 710 may measure a magnitude of a signal received from an opponent device communicating with the device, a gateway connected to a network server, or a network infrastructure, for example, a base station, and the like. In this instance, the magnitude of a signal may be measured periodically or in response to an event occurring aperiodically.

A case in which the opponent device enters an area of a gateway connected to the device may be given as the event occurring aperiodically.

In operation 730, the device may compare a magnitude of a signal received from the opponent device with a magnitude of a signal received from the medium currently accessed by the device. Here, the magnitude of a signal received from the medium currently accessed by the device may correspond to a threshold for a change of an access mode that is a type of statistics set according to a system operation.

In operation 740, when the magnitude of the signal received from the opponent device decreases to be less than or equal to the magnitude of the signal received from the medium currently accessed by the device, the device may transmit, to a device resource management apparatus, a signal requesting a change of an access mode. In this instance, the device transmit, to the device resource management apparatus, information about the magnitude of the signal received from the opponent device measured by the device along with the signal requesting a change of an access mode.

The device resource management apparatus receiving the request for a change of an access mode from the device may select an optimal access mode appropriate to the corresponding device.

In this instance, the device resource management apparatus may select the optimal access mode appropriate to the corresponding device based on parameter information and a weighting wi for each parameter information as illustrated in Equation 1 and Equation 2.

The parameter information may include at least one of a magnitude of a signal received from the opponent device rx_str, a level of an interference signal for the device intf_lev, a power consumption level of the device pwr_req, and a charging level chg_lev.

Thereafter, the device resource management apparatus may transmit, to the device, an access mode change response including a selected optimal access mode in response to the signal requesting a change of an access mode.

The optimal access mode may correspond to one of an NW mode, a GW mode, a DM mode, and a RM mode.

The device receiving, from the device resource management apparatus, the access mode change response including the optimal access mode in operation 750 may determine whether the optimal access mode selected by the device resource management apparatus equals an access mode currently serving the device in operation 760.

When the optimal access mode does not equal the current access mode, the device may change the current access mode to the optimal access mode in operation 770. However, when the optimal access mode equals the current access mode, the device may remain in the current access mode.

Figure 8:
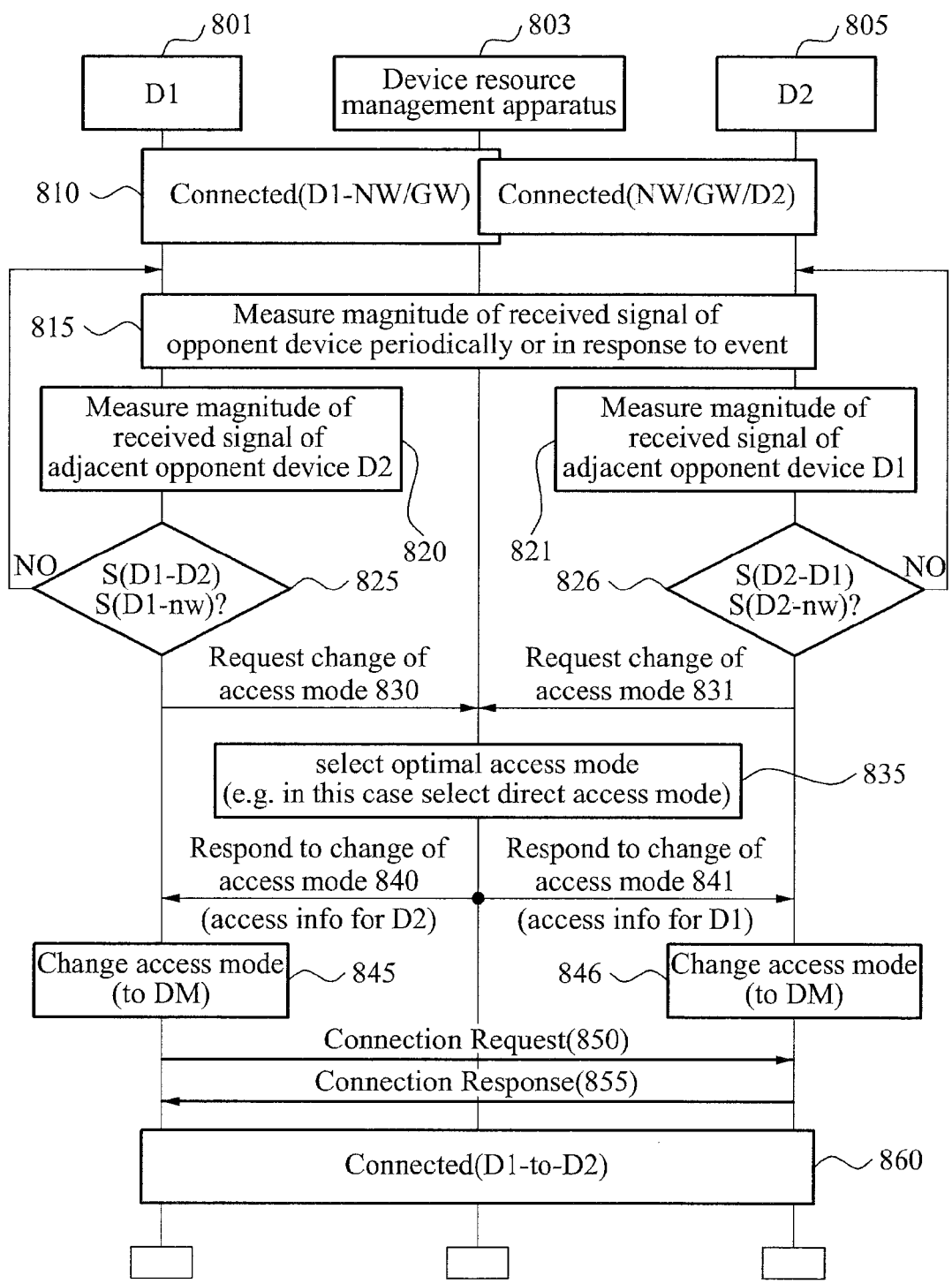
FIG. 8 is a diagram illustrating a process of changing an access mode by a device, an opponent device, and a device resource management apparatus according to embodiments of the present invention.

FIG. 8 is a diagram illustrating a process of changing an access mode by a device, an opponent device, and a device resource management apparatus according to embodiments of the present invention.

Referring to FIG. 8, it may be presumed that the device changes an access mode from an NW mode to a DM mode, and the device resource management apparatus is included a gateway connected to the device or a network infrastructure.

When a device D1 801 communicating in the NW mode in operation 810 satisfies a predetermined requirement, the device D1 801 may measure a magnitude of a received signal of an opponent device D2 805 currently communicating with the device D1 801, periodically or in response to a predetermined event, in operation 815.

Here, a case in which the opponent device D2 805 enters an area of a gateway connected to the device D1 801 may be provided as an example of the predetermined requirement.

In this instance, the device D1 801 may measure a magnitude of a signal the device D1 801 received from the opponent device D2 805 adjacent to the device D1 801 in operation 820, and the opponent device D2 805 may measure a magnitude of a signal the opponent device D2 805 received from the device D1 801 adjacent to the opponent device D2 805 in operation 821.

In operation 825, the device D1 801 may compare a magnitude of a signal corresponding to S(D1-D2) received from the opponent device D2 805 with a magnitude of a signal corresponding to S(D1-NW) received from a medium, for example, the gateway or the network infrastructure accessed by the device D1 801 according to a current access mode.

When the magnitude of a signal corresponding to S(D1-D2) the device D1 801 receives from the opponent device D2 805 exceeds the magnitude of a signal corresponding to S(D1-NW) the device D1 801 received from the gateway or the network infrastructure in operation 825, the device D1 801 may request a device resource management apparatus 803 for a change of an access mode in operation 830. In this instance, the device D1 801 may transmit information about a magnitude of a received signal measured by the device D1 801 along with a signal requesting a change of an access mode. A similar scheme may be applied to the opponent device D2 805 in operations 826 and 831.

In operation 835, the device resource management apparatus 803 receiving a request for a change of an access mode from the device D1 801 may select an optimal access mode for the device D1 801. In this instance, the description with reference to FIG. 7 may be referred to for a criterion for selecting an optimal access mode by the device resource management apparatus 803.

When a direct access mode between the device D1 801 and the opponent device D2 805 is selected as the optimal access mode, the device resource management apparatus 803 may inform each of the device D1 801 and the opponent device D2 805 about the selected optimal access mode, for example, the direct access mode in response to the request for a change of an access mode in operations 840 and 841.

In this instance, the device resource management apparatus 803 may transmit access information used for mutual access with the device D1 801 or the opponent device D2 805, currently communicating, along with a response to the request for a change of an access mode.

The access information may include at least one of an ID number of the opponent device D2 805, an IP address of the opponent device D2 805, information about a radio resource used for communication with the opponent device D2 805, and information about an access timing for the opponent device D2 805.

In operations 845 and 846, the device D1 801 receiving the response to the request for a change of an access mode may reconstruct a form of software or hardware of the device D1 801 according to the optimal access mode, for example, the direct access mode. The device D1 801 may attempt to access the opponent device D2 805 using the access information described in the foregoing.

In this instance, a connection between the device D1 801 and the opponent device D2 805 may be based on a random access procedure performed between a terminal and a base station in a cellular system. Here, the device D1 801 may correspond to the terminal and the opponent device D2 805 may correspond to the base station.

When the device D1 801 requests the opponent device D2 805 for an access in operation 850, the opponent device D2 805 may respond to the request in operation 855.

As such, in operation 860, an initial synchronization may be performed between the device D1 801 and the opponent device D2 805, and the device D1 801 and the opponent device D2 805 may communicate with each other in a direct communication mode. When an attempt to access the opponent device D2 805 fails in operation 850, the device D1 801 and the opponent device D2 805 may communicate with each other in a previous access mode corresponding to the NW mode of operation 810.

Figure 9:
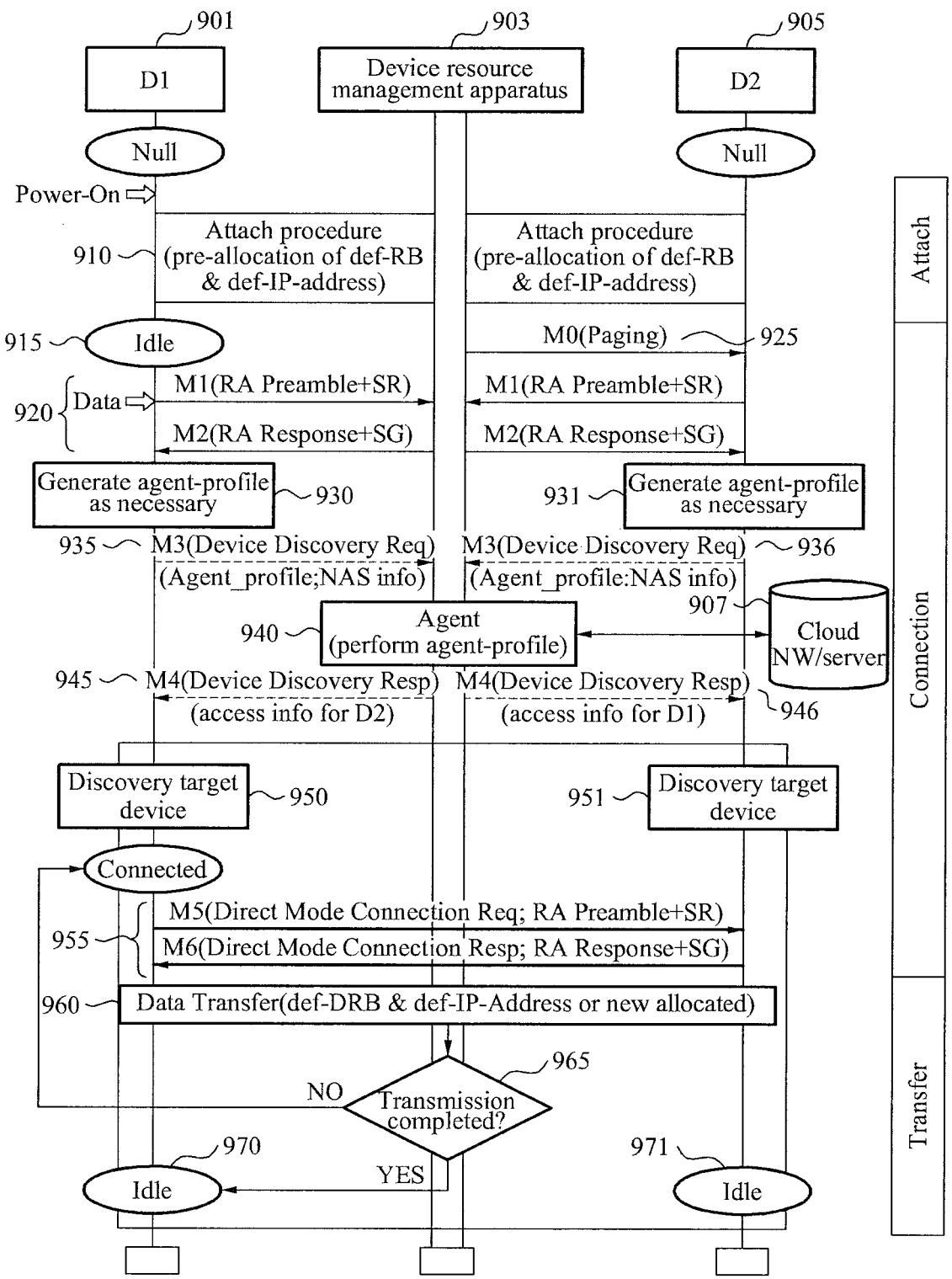
FIG. 9 is a diagram illustrating an initial access procedure for transmitting data by devices using a direct communication mode according to embodiments of the present invention.

FIG. 9 is a diagram illustrating an initial access procedure for transmitting data by devices using a direct communication mode according to embodiments of the present invention.

Referring to FIG. 9, a network for transmitting data by devices using a direct communication mode may include a device D1 901, a device resource management apparatus 903 included in a network infrastructure or a gateway, and an opponent device D2 905.

A procedure of transmitting data by the devices using the direct communication mode may include an "attach procedure" for registering a device in the device resource management apparatus 903 and a "transfer procedure" for transmitting data.

In this instance, a signaling (or control) path used for a predetermined device D1 901 to access the opponent device D2 905 to communicate may be formed through the network infrastructure or the gateway, and a traffic path may be formed by a direct connection between the predetermined device D1 901 and the opponent device D2 905.

In operations 910 through 915, as the attach procedure, the device D1 901 may register the device D1 901 in the network infrastructure or the gateway to perform an initial access for direct communication, and may remain in an idle state.

In this instance, the device D1 901 may perform a registering procedure by receiving authentication from the network infrastructure or the gateway and a procedure causing the network infrastructure or the gateway to update current location information of the device D1 901.

In operation 910, through the procedures described in the foregoing, the device D1 901 may receive an assignment of a default IP address to be used by the device D1 901 and a default radio bearer used for communication.

In operation 915, the device D1 901 may enter an idle state after downloading system information used for network access from the network infrastructure or the gateway.

Operations 920 through 945 may correspond to operations for setting, by the device D1 901, a signaling path with the opponent device D2 905 through the network infrastructure or the gateway.

In operation 920, when data to be sent to the opponent device D2 905 is stored in a buffer, the device D1 901 in the idle state may attempt access to the network infrastructure or the gateway through a random access. In this instance, it may be presumed that the opponent device D2 905 is registered in the network infrastructure or the gateway.

The network infrastructure or the gateway may access the opponent device D2 905 through a paging in operation 925, and the device D1 901 and the opponent device D2 905 may transmit, to the network infrastructure or the gateway, an M3 message corresponding to a Device Discovery Req requesting an observation of an opponent device so as to set mutual traffic access in operation 935. In this instance, the M3 message may include Agent profile Info and information for requesting the device resource management apparatus 903 for an additional function. Network attached storage (NAS) info may be given as an example of requesting the additional function.

After performing a network access function, each of the device D1 901 and the opponent device D2 905 may request the device resource management apparatus 903 included in the network infrastructure or the gateway to perform, as a proxy, the additional function by a device agency module. In operation 930, each of the device D1 901 and the opponent device D2 905 may generate an agent profile for requesting the device resource management apparatus 903 to perform, as a proxy, a function of the corresponding device. The agent profile may include at least one function to be performed by the device resource management apparatus 903 as a proxy for a device.

For example, in operation 940, the device resource management apparatus 903 included in the network infrastructure or the gateway may perform an identification procedure for identifying a device identifier as a proxy for the device D1 901 by the device agency module.

The device resource management apparatus 903 may perform the corresponding additional function by communicating with a cloud network/server 907, and may inform the device D1 901 and the opponent device D2 905 about a result of performing the corresponding additional function through an M4 message corresponding to a Device Discovery Resp in operation 945. The M4 message may include access information used for accessing the opponent device D2 905 to communicate with the device D1 901.

Operations 950 through 970 may correspond to operations for directly setting a traffic path by the device D1 901 and the opponent device D2 905.

In operation 950, each of the device D1 901 and the opponent device D2 905 may set a form of software and hardware of the corresponding device according to a direct communication mode.

In operation 955, the device D1 901 may set a traffic path by directly exchanging an M5 message corresponding to a Direct Mode Connection Req and an M6 message corresponding to a Direct Mode Connection Resp with the opponent device D2 905 using the access information received from the network infrastructure or the gateway.

Thereafter, in operation 960 corresponding to a data transfer procedure, the device D1 901 may exchange traffic with the opponent device D2 905 using a resource assigned through the attach procedure in operation 910, for example, the default IP address and the default radio bearer.

When a transmission of traffic is not completed in operation 960, the device D1 901 may request an additional resource using the M5 message and the M6 message, which is referred to as a scheduling request SR, and may perform a procedure for receiving an assignment of a resource in response, which is referred to as a scheduling grant SG in operation 965.

In operations 970 and 971, the device D1 901 and the opponent device D2 905 may be in an idle state after completing a transmission of traffic.

Figure 10:
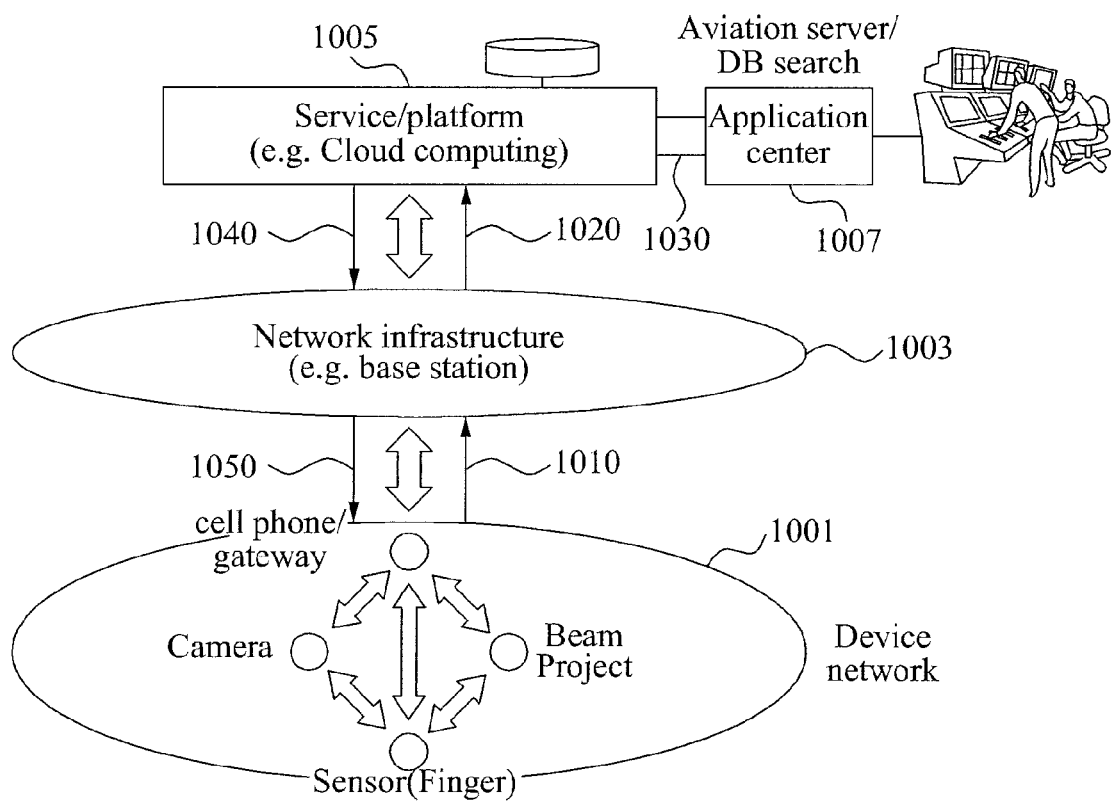
FIG. 10 is a diagram illustrating a scenario using a direct communication mode to performed between devices according to embodiments of the present invention.

FIG. 10 is a diagram illustrating a scenario using a direct communication mode performed between devices according to embodiments of the present invention.

Referring to FIG. 10, a user may search for currently updated information for a flight time using a direct communication mode between five-sense devices the user wears, and the corresponding procedure is described below.

In operation 1010, the five-sense devices including a finger sensor, a camera, and a beam projector and a device network 1001 including a cell phone or a gateway may recognize an object. Here, recognizing the object may correspond to an operation of recognizing an airline ticket of the user by the camera, which is referred to as an image recognition marker.

In operation 1020, the camera may access the cell phone and deliver information about the airline ticket through a network infrastructure 1003. The network infrastructure 1003 may correspond to, for example, a base station.

In operation 1030, to search for information about a current flight time, the cell phone may request an application center 1007 for a service through a service/platform 1005. Here, the service/platform 1005 may correspond to a cloud computer, and the application center 1007 may correspond to an aviation server or an aviation database.

In operations 1040 and 1050, the service/platform 1005 may provide the user with information searched for through the network infrastructure 1003 or the gateway of the device network 1001.

Operation 1020 may correspond to direct communication between devices, and operation 1030 may correspond to indirect communication between a device and a server.

Figure 11:
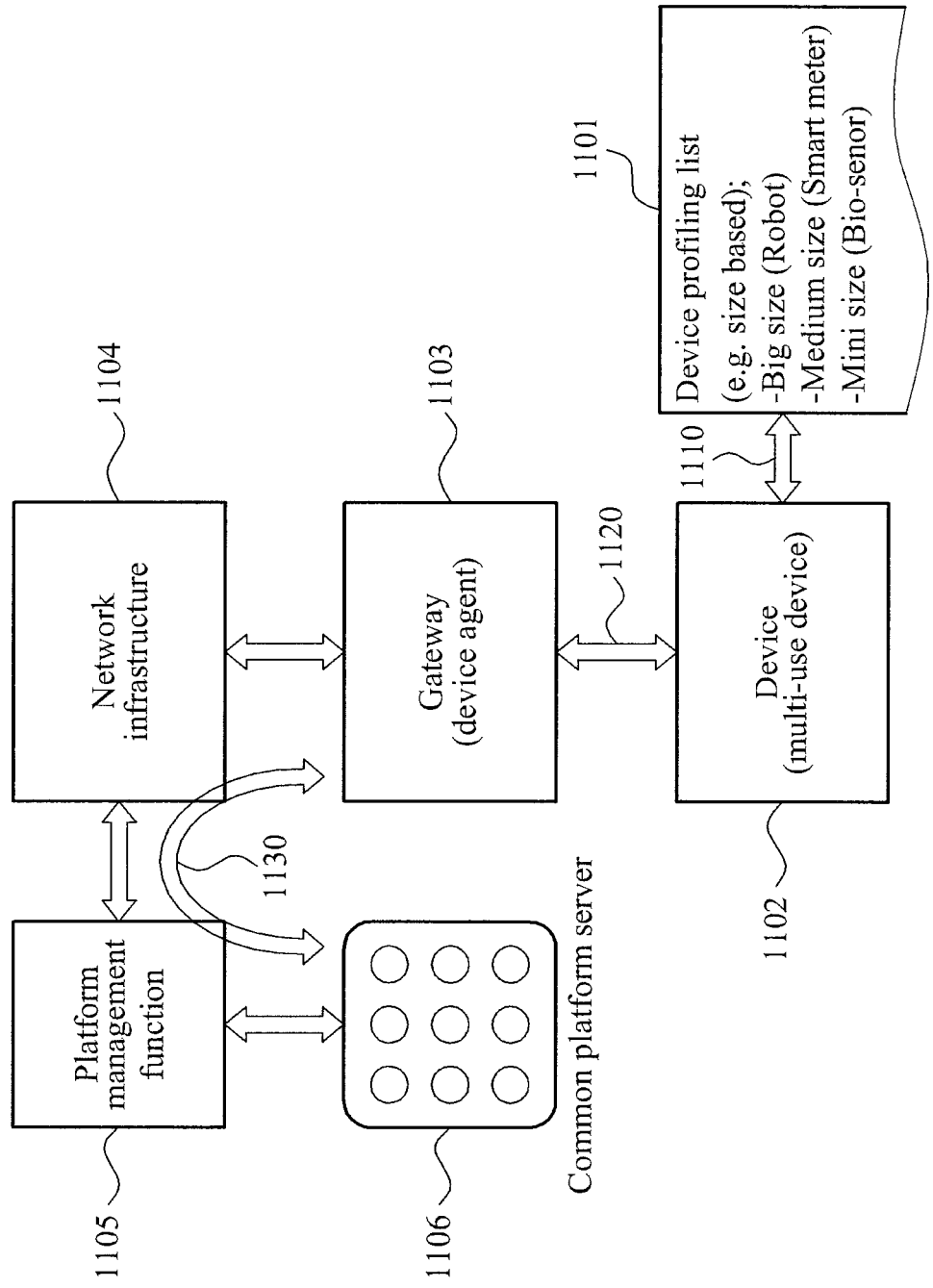
FIG. 11 is a diagram illustrating that a portion of functions of a device is performed by a device resource management apparatus as a proxy according to embodiments of the present invention.

FIG. 11 is a diagram illustrating that a portion of functions of a device is performed by a device resource management apparatus as a proxy according to embodiments of the present invention.

The device resource management apparatus may adjust a complexity level of functional elements of a device, for example, software and hardware based on use, power consumption, and a size of the device, and may perform a portion of functions of the device as a proxy. In this instance, a mode in which the device resource management apparatus performs a portion of the device as a proxy may be referred to as an agent mode, and the device may operate based on a meta-function in the agent mode. The device resource management apparatus may be included in a gateway or a network infrastructure.

Referring to FIG. 11, in operation 1110, a device 1102 may set functional elements of the corresponding device, for example, software and hardware according to a complexity level appropriate to use, power consumption, and a size of a device recorded in a device profiling list 1101. In this instance, the device profiling list 1101 may be downloaded from the device resource management apparatus.

In operation 1120, the device 1102 may classify the functional elements of the corresponding device set according to the complexity level into functions to be performed by the device 1102 and functions that may be performed by another device, and may request a device agency module of the device resource management device to perform functional elements that may be performed as a proxy.

In this instance, measuring a wireless environment of a device may be given as an example of the functions to be performed by the device 1102, and an ID verification, an authentication function, an NAS function of a 3rd generation partnership project (3GPP), and the like may be given as the functions that may be performed by another device.

In operation 1130, the device agency module requested to perform a portion of functions of the device 1120 as a proxy may perform the corresponding functional element with a common platform server 1106 through a network infrastructure 1104 and a platform management function 1105, and may feed back the corresponding result to the device 1102. The device 1102 may perform a desired operation using a minimum of a transmission and reception function and a resource such as a memory.

Figure 12:
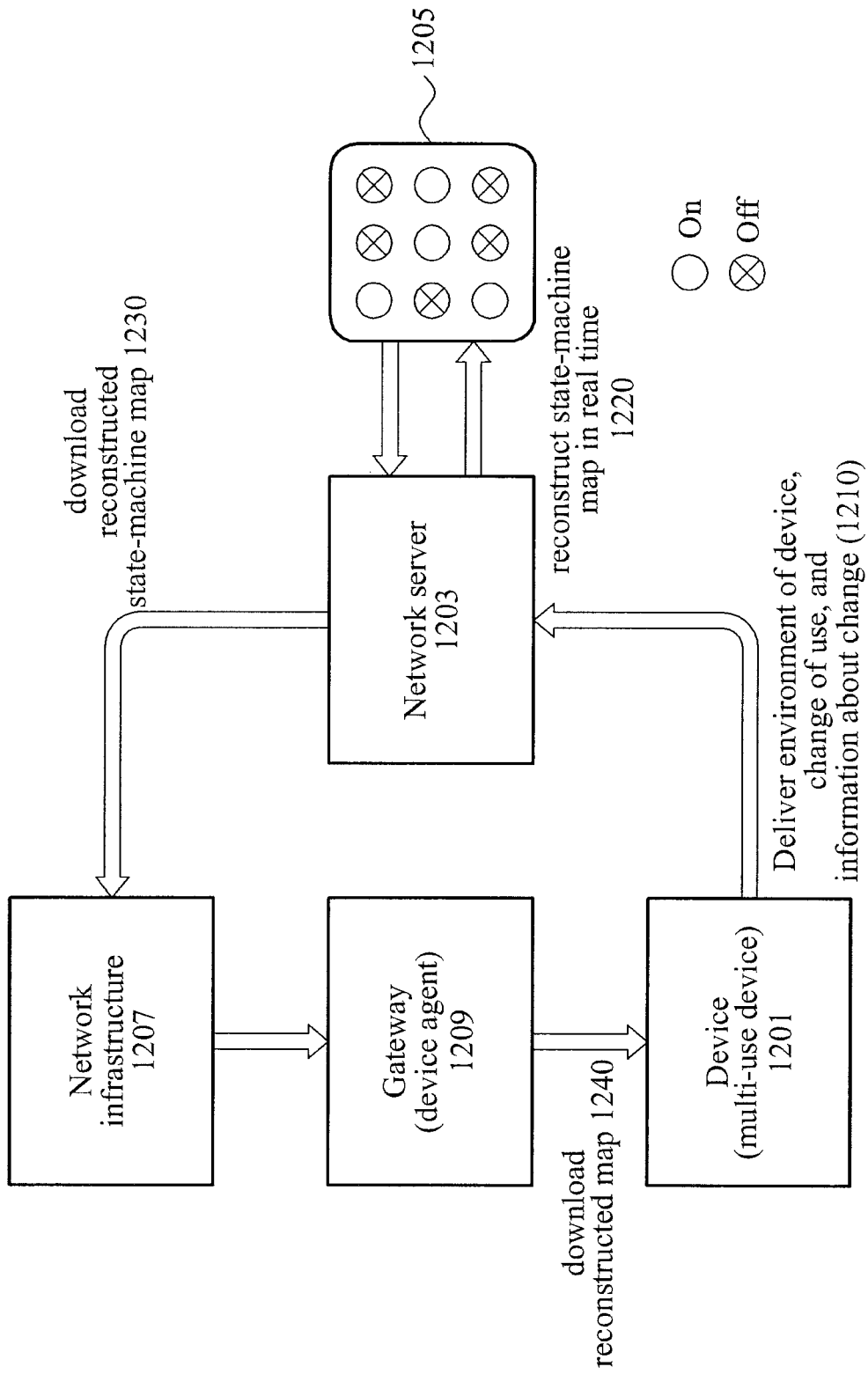
FIG. 12 is a diagram illustrating that a device dynamically reconstructs a form of functional elements of a device based on a state machine according to embodiments of the present invention.
Figure 13:
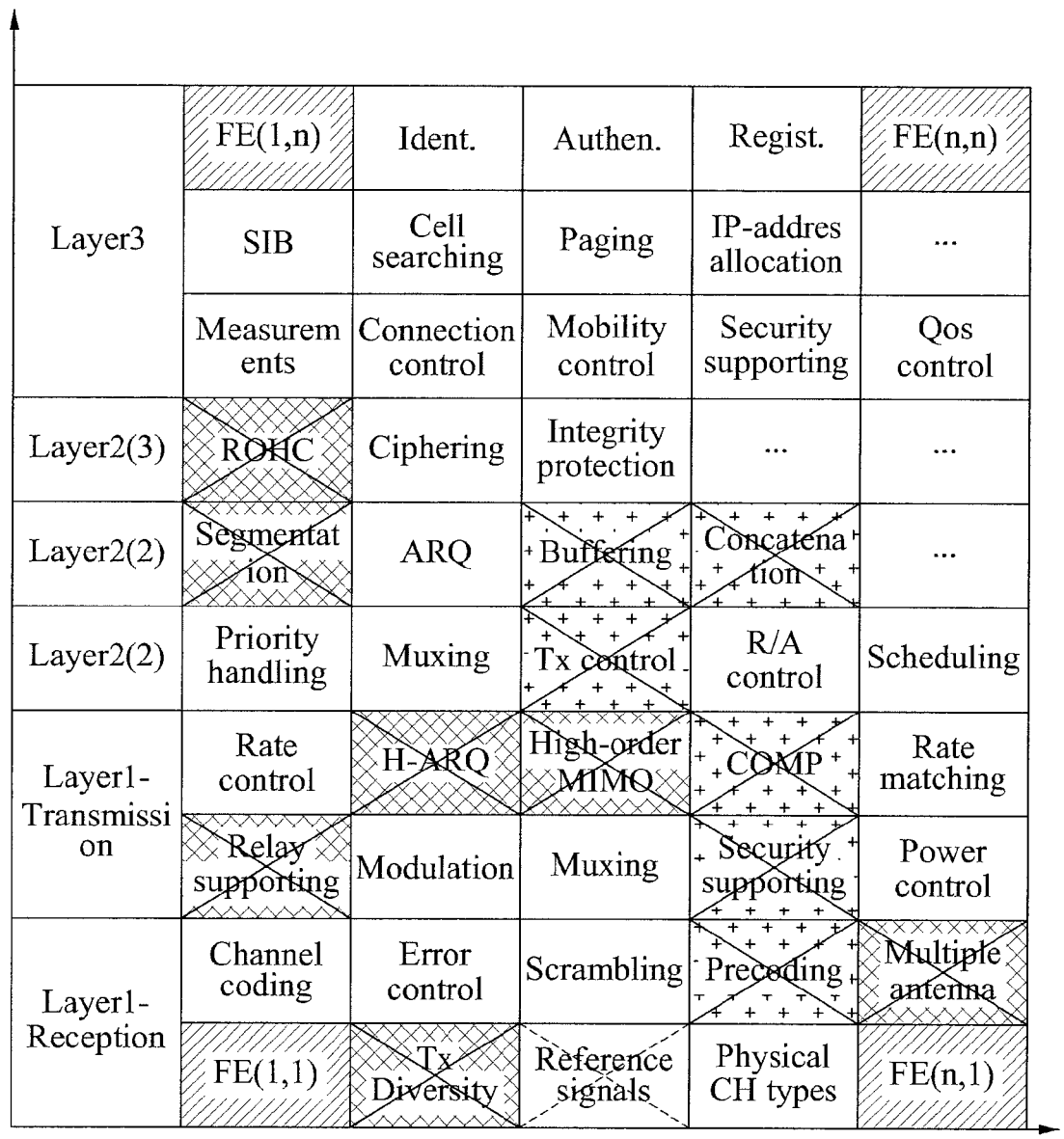
FIG. 13 is a diagram illustrating a state machine map reconstructed by a network server to reconstruct functional elements of a device in real time according to embodiments of the present invention.

FIG. 12 is a diagram illustrating that a device dynamically reconstructs a form of functional elements of a device based on a state machine according to embodiments of the present invention, and FIG. 13 is a diagram illustrating a state machine map reconstructed by a network server to reconstruct functional elements of a device in real time according to embodiments of the present invention.

Referring to FIGS. 12 and 13, a device 1201 may dynamically reconstruct functional elements of a device according to a change of a use, a wireless environment, and the like while maintaining a full set function such as software and hardware of a wireless interface and a related function.

For example, in operation 1210, the device 1201 may deliver, to a network server 1203, a change information profile including at least one piece of change information about a change between a feature of a device and context-aware information including a use of the device, a capability of the device, or a propagation environment for the device in response to a change of a circumstance and a use of the device 1201.

In operation 1220, the network server 1203 may reconstruct a state machine map for functional elements of a device based on information about a change of the device 1201.

In this instance, the network server 1203 may classify the entire functional elements into functional elements not to be used and functional elements to be used. Thereafter, the network server 1203 may enable an operation for the functional elements to be used by turning on and disabling an operation for the functional elements not to be used by turning off the operation, thereby reconstructing a state machine map for each functional element used by a device. Referring to FIG. 13, a portion marked by X indicates that an operation of the functional elements not to be used by the corresponding device is turned off to be disabled according to the information about a change of the device 1201.

In operations 1230 and 1240, the network server 1203 may deliver the reconstructed state machine map 1205 to the corresponding device 1201 through a network infrastructure 1207 and a gateway 1209. The reconstructed state machine map 1205 may be delivered to the corresponding device 1201 through a download, and the like. The device 1201 may reconstruct and operate each functional element according to a configuration of the state machine map 1205. A scheme described in the foregoing may be applied to a multi-use device having mobility.

Figure 14:
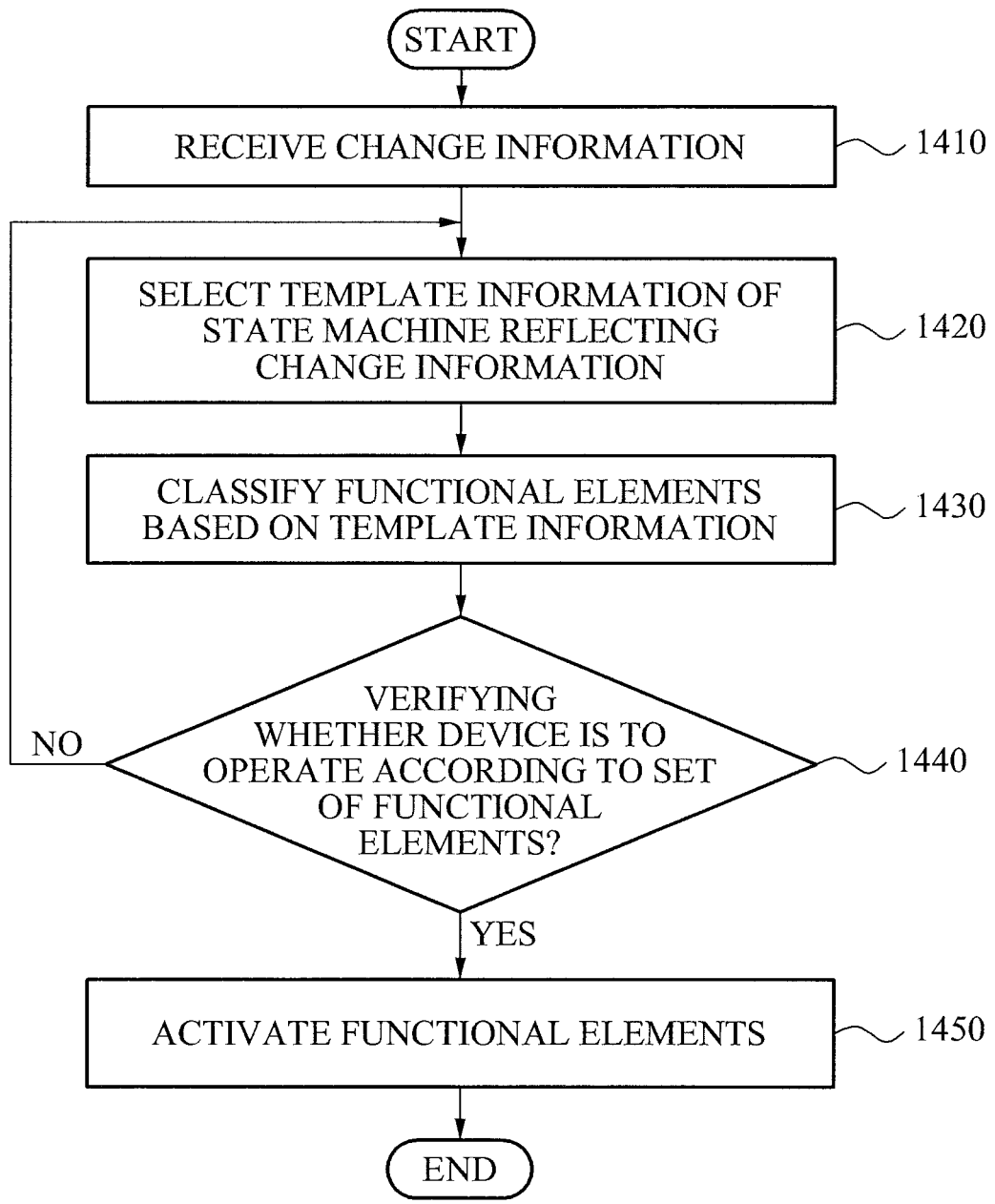
FIG. 14 is a flowchart illustrating a method of reconstructing functional elements of a device by a network server according to embodiments of the present invention.

FIG. 14 is a flowchart illustrating a method of reconstructing functional elements of a device by a network server according to embodiments of the present invention.

Referring to FIG. 14, in operation 1410, a network server may receive change information about a change from a device. Here, the change information may include at least one of a feature of the device and context-aware information including a use of the device, a capability of the device, or a propagation environment for the device.

The network server may select template information of a state machine reflecting the at least one piece of change information in operation 1420, and may reconstruct the functional elements of the device based on the template information.

To reconstruct the functional elements of the device, the network server may classify the functional elements of the device into functional elements to be used and functional elements not to be used in operation 1430. In this instance, the functional elements of the device may be classified based on the template information.

In operation 1440, the network server may verify whether the device is to operate according to a set of functional elements constructed by combining the functional elements to be used.

In operation 1450, the network server may activate the functional elements included in the set of functional elements when the device is to operate according to the set of functional elements. When the device is not to operate according to the set of functional elements, the network server may return to operation 1420 and select the template information of a state machine.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

EXPLANATION OF REFERENCE NUMERALS

110: Access mode selection module
130: Device agency module
150: Frequency band selection module
170: Radio access technology selection module
190: Form shaping module

What is claimed is:

1. A device resource management apparatus in a wireless network, the device resource management apparatus comprising:
   an access mode selection module to select a predetermined access mode among a plurality of access modes for a device, each of the plurality of access modes determining a type of a medium included in an access route between the device and an opponent device, and select the predetermined access mode based on parameter information,
   wherein the parameter information includes at least one of a magnitude of a signal received from the opponent device, an interference signal level for the device, a power consumption level of the device, a charging level of the device, and based on a weighting for each of the parameter information; and a device agency module to obtain an agent profile corresponding to the device when an access route between the device and the opponent device is formed according to the predetermined access mode, and to perform, as a proxy for the device, at least one function defined by the agent profile.

2. The device resource management apparatus of claim 1, wherein the plurality of access modes includes at least one of a first access mode having an access route that includes a network infrastructure as the medium, a second access mode having an access route that includes a gateway as the medium, a third access mode directly accessing the opponent device without using the medium, and a fourth access mode having an access route that includes an adjacent device of the device as the medium.

3. The device resource management apparatus of claim 1, wherein the access mode selection module selects the predetermined access mode based on a result obtained by comparing a magnitude of a signal the device receives from the opponent device with a predetermined threshold for changing the access mode.

4. The device resource management apparatus of claim 1, wherein the device agency module performs the at least one function by communicating with a network server, and transmits, to the device, a message including a result of performing the at least one function and access information used for accessing the opponent device.

5. The device resource management apparatus of claim 1, further comprising: a frequency band selection module to dynamically assign a frequency band, based on interference at the predetermined access mode, to be used by the device.

6. The device resource management apparatus of claim 1, further comprising: a radio access technology selection module to determine a radio access technology for the device based on a characteristic of traffic, and to inform the device about information of the determined radio access technology.

7. The device resource management apparatus of claim 1, further comprising: a form shaping module to change, in real time, a form of functional elements of the device based on at least one piece of change information about a change between a feature of the device and context-aware information including a use of the device, a capability of the device, or a propagation environment for the device.

8. The device resource management apparatus of claim 7, wherein the form shaping module further comprises: a level adjustment unit to adjust a complexity level of the functional elements of the device based on a use, a power consumption, and a size of the device.

* * * * *